Jan. 20, 1953 J. B. BRENNAN 2,626,294
STORAGE BATTERY ELECTRODE AND METHOD OF MAKING
Filed March 23, 1950

INVENTOR.
JOSEPH B. BRENNAN
BY Hudson Boughton,
Williams, David & Hoffmann.
ATTORNEYS Patented Jan. 20, 1953

2,626,294

UNITED STATES PATENT OFFICE 2,626,294

STORAGE BATTERY ELECTRODE AND METHOD OF MAKING

Joseph B. Brennan, Cleveland, Ohio

Application March 23, 1950, Serial No. 151,405

5 Claims. (Cl. 136—28)

This invention relates to a storage battery electrode and method of making same.

The electrode of this invention is characterized by the fact that a porous electrolytically inert structure supports and retains active materials in conductive relationship with a porous contacting conductor of coherent and adherent metal.

This application is a continuation in part of my pending application Serial No. 40,919, filed July 27, 1948.

Referring to the drawings which accompany this specification:

Figure 1:
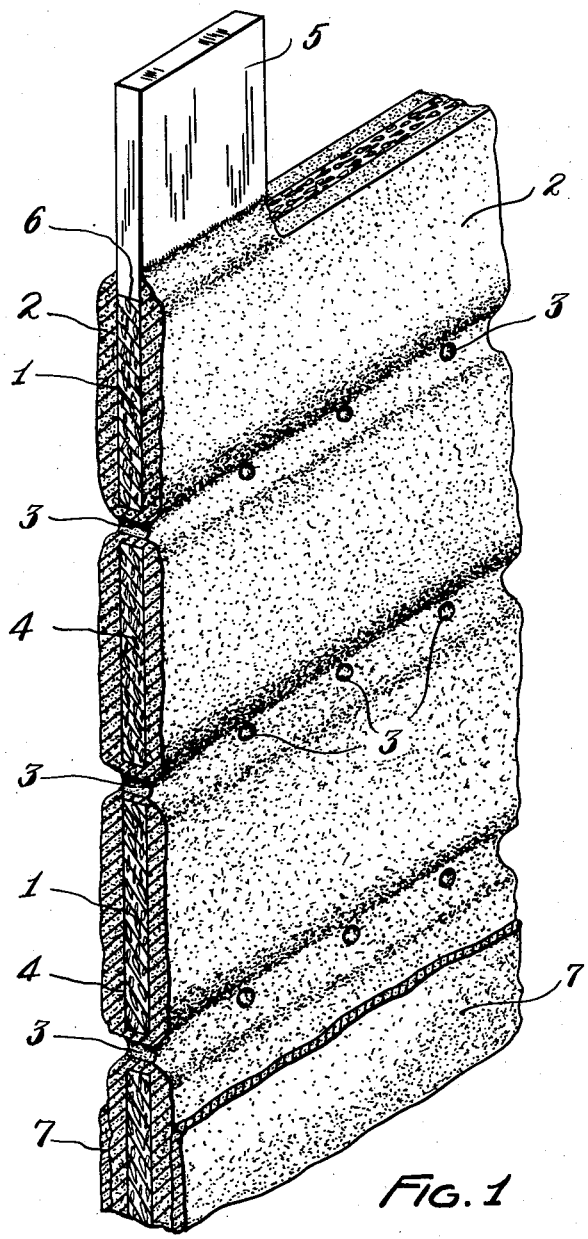
Figure 1 is an isometric section of an electrode according to this invention.

Figure 1 represents an isometric section of an electrode according to this invention wherein 1 represents a perforated strip as of asbestos paper or asbestos board exaggerated in thickness impregnated with active material 4, having the perforations 3 therethru, having a porous spray deposited coating of metal 2 thereover, which spray deposited coating extends into and thru the perforations 3 so as to conductively unite the coating at intervals. The terminal 5 is attached by welding or other means to the electrode body at 6. 7, Figure 1 represents a partial section of an overlay of porous spray deposited particulate dielectric to act as an exterior separator and support for the electrode of this invention, bonded to said electrode and permeable throughout by the electrolyte.

Figure 2:
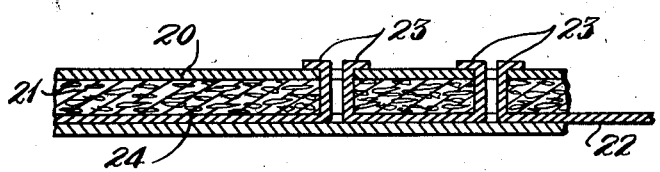
Figure 2 is a copy of Figure 4 of the drawings of my pending application Serial No. 40,919, filed July 27, 1948, and represents a slightly modified form of electrode according to this invention.

Referring to Figure 2 of the drawings accompanying this specification, 24 is a layer as of asbestos paper or board impregnated with active material 21 and coated with porous metal layers 20 having a terminal 22 attached thereto by means of extruded rivets 23.

To make the electrode of this invention I impregnate for example porous asbestos plates having a porous conductive coherent coating of particulate nickel either sintered thereon or spray deposited with molten nickel particles thereover with nickel nitrate solution by immersing the metalized asbestos plates in a nickel nitrate solution and thereafter immersing the plate so previously impregnated with nickel nitrate in a KOH concentrated solution, with the result that the pores of the base asbestos material and the porous metal enclosure or coating are filled with nickelous hydroxide active material, which is conductive when activated, and shows capacity in proportion to the amount of porous space filled with nickelous hydroxide therein.

It is possible to secure a capacity in a plate having electrolytically inert porous base material, such as asbestos fibrous sheet material coated with porous conductive particulate spray deposited nickel equal in capacity to that procurable in an all porous nickel plate of equal volume and of much greater nickel content. Other porous base materials suitable for such use in making battery plates are ceramic materials, such as alkali resistant fibreglass or porous $Al_2O_3$ or porous carbon or porous polystyrene particulate membranes, or porous fabrics inert to the electrolyte, or porous resinous, or porous fused ceramic base materials.

Thus I am able to make a lighter, higher capacity electrode than has heretofore been made by the use of cheap materials in combination with only a much smaller amount of conductive metal.

It is preferable that the porous metal coating adhere to the base asbestos material so as to secure a structurally strong electrode. However, it is possible to secure this adherence by an assembly made up of the porous base material and the porous nickel material in strip form, being applied as by welding or other mechanical fastening means to the asbestos.

It is also contemplated according to this invention to enclose the molten particulate metal coated porous base material electrode in a coating of porous particulate dielectric material, such as of spray deposited polystyrene or other inert synthetic porous dielectric material to make a unitary electrode and separator. For example, I take a piece of porous asbestos strip .015 thick and coat it continuously on both sides and about the edges thereof with a porous spray deposited coating of nickel about .005 thick and thereafter pass this strip through nickel nitrate solution to impregnate thoroughly all the pores of the asbestos and porous nickel layer, and thereafter pass this strip thru KOH solution continuously to convert the nickel nitrate in the pores of the porous asbestos and porous nickel coating to nickelous hydroxide, and then cut up this strip into 5" lengths and weld a nickel coated terminal thereto, and activate this plate by cycling electrically, whereupon I obtain a capacity of 1.5 ampere hours in such a plate assembled with two negative identically made plates, but activated with cadmium oxide in the pores thereof. This is as much capacity as I can get with an all porous nickel plate of equal volume.

The structure and treatment and impregnation of the negative plates is carried out in the same way as the positive plates, the only difference being that the active materials with which the plates are impregnated is either activated cadmium oxide, or iron oxide, or zinc oxide, or silver oxide, or combinations of these or other oxides suitably useful as active negative materials in an alkaline cell.

In any case, according to my invention I secure an electrode wherein the active materials are supported by a porous plate of electrolytically inert material containing the active material in the interstitial pores thereof in unitary structure with a porous contact plate and terminal.

It is also contemplated according to this invention to use strips of asbestos, or perforated asbestos, or asbestos cords, or sticks, which may be spaced closely together or woven, or partially fastened together by the juncture of the exterior layers of spray deposited metal, being welded together through apertures in the base material and/or about the edges thereof. Obviously thin carbon layers or layers of particulate porous resinous materials, so long as the layers are porous and electrolytically inert, may be perforated or used in strip form and joined together as by welding or spraying.

By electrolytically inert base material I mean a self-supporting piece, strip or layer of such material which will not disintegrate or break up in use or in the processing involved, in making electrodes according to this invention.

Having described my invention, what I claim is:

1. A storage battery electrode comprising a particulate porous carbon plate impregnated with an active battery oxide and having a coating of porous particulate battery metal thereover.

2. A storage battery electrode comprising a unitary porous particulate carbon plate, the interstitial pores of which are filled with porous active nickelous oxides and hydroxide having a layer of porous particulate nickel thereover.

3. A storage battery electrode as in claim 2, wherein the impregnating compound includes cadmium oxide.

4. Method of making a storage battery electrode by impregnating a porous electrolytically inert support with nickel nitrate, converting said nickel nitrate to nickelous hydroxide while included in the pores of said support and thereafter applying a porous metallic electrolytic membrane thereto in conductive unitary relationship.

5. Method of making a storage battery electrode by applying a porous conductive metallic coating to a porous electrolytically inert support and thereafter impregnating the so coated support with a nitrate of active battery material and thereafter converting said nitrate to an active battery material.

JOSEPH B. BRENNAN.

REFERENCES CITED

The following references are of record in the file of this patent:

UNITED STATES PATENTS

| Number | Name | Date |
|---|---|---|
| 2,251,913 | Brennan | Aug. 12, 1941 |
| 2,304,073 | Brennan | Dec. 8, 1942 |
| 2,310,932 | Brennan | Feb. 16, 1943 |
| 2,361,378 | Brennan | Oct. 31, 1944 |
| 2,375,211 | Brennan | May 8, 1945 |
| 2,444,914 | Brennan | July 13, 1948 |
| 2,446,524 | Brennan | Aug. 10, 1948 |